(12) United States Patent
Weickert et al.

(10) Patent No.: US 9,192,903 B2
(45) Date of Patent: Nov. 24, 2015

(54) HIGH THROUGHPUT REACTOR ASSEMBLY FOR POLYMERIZATION OF OLEFINS

(75) Inventors: Günter Weickert, Ahaus (DE); Erik Eriksson, Stenungsund (SE); Michiel Bergstra, Berchem (BE); Klaus Nyfors, Porvoo (FI)

(73) Assignee: BOREALIS AG, Vienna (AT)

( * ) Notice: Subject to any disclaimer, the term of this patent is extended or adjusted under 35 U.S.C. 154(b) by 163 days.

(21) Appl. No.: 14/002,426

(22) PCT Filed: Mar. 2, 2012

(86) PCT No.: PCT/EP2012/000960
§ 371 (c)(1),
(2), (4) Date: Nov. 12, 2013

(87) PCT Pub. No.: WO2012/116844
PCT Pub. Date: Sep. 7, 2012

(65) Prior Publication Data
US 2014/0058051 A1    Feb. 27, 2014

(30) Foreign Application Priority Data

Mar. 2, 2011   (EP) .................................... 11001744

(51) Int. Cl.
*C08F 2/01*  (2006.01)
*C08F 2/34*  (2006.01)
(Continued)

(52) U.S. Cl.
CPC .............. *B01J 8/1872* (2013.01); *B01J 8/1827* (2013.01); *B01J 8/388* (2013.01); *B01J 19/2465* (2013.01);
(Continued)

(58) Field of Classification Search
CPC ........ B01J 8/1827; B01J 8/1872; B01J 8/388; C08F 2/01; C08F 2/34
USPC .................. 422/131, 134; 526/65, 67, 88, 918
See application file for complete search history.

(56) References Cited

U.S. PATENT DOCUMENTS

| 4,107,414 A | 8/1978 | Giannini et al. |
| 4,186,107 A | 1/1980 | Wagner |

(Continued)

FOREIGN PATENT DOCUMENTS

| DE | 19744710 A1 | 4/1999 |
| EP | 0045975 A2 | 2/1982 |

(Continued)

OTHER PUBLICATIONS

International Search Report for International Application No. PCT/EP2012/00096.
(Continued)

*Primary Examiner* — Fred M Teskin
(74) *Attorney, Agent, or Firm* — Roberts Mlotkowski Safran & Cole, P.C.

(57) ABSTRACT

Reactor assembly for the production of polymers including a fluidized bed reactor (1) comprising a bottom zone (5), a middle zone (6) and an upper zone (7), an inlet (8) for the fluidization gas located in the bottom zone (5), an outlet (9) for the fluidization gas located in the upper zone (7); the outlet (9) for the fluidization gas being coupled with the fluidized bed reactor (1) via inlet (8) via a gas circulation line; means for separation of solids from gas (2) being connected to said gas circulation line; the equivalent cross-sectional diameter of the upper zone (7) being monotonically decreasing with respect to the flow direction of the fluidization gas through the fluidized bed reactor; the middle zone (6) having an essentially constant equivalent cross-sectional diameter with respect to the flow direction of the fluidization gas through the fluidized bed reactor; the equivalent cross-sectional diameter of the bottom zone (5) being monotonically increasing with respect to the flow direction of the fluidization gas through the fluidized bed reactor; characterized in that the ratio of the height of the fluidized bed reactor to the equivalent cross-sectional diameter of the middle zone of the fluidized bed reactor is from 2 to 10; and whereby said upper zone (7) is directly connected to said middle zone (6).

14 Claims, 4 Drawing Sheets

(51) Int. Cl.

| | | |
|---|---|---|
| *B01J 8/24* | (2006.01) | |
| *B01J 8/18* | (2006.01) | |
| *B01J 8/38* | (2006.01) | |
| *B01J 19/24* | (2006.01) | |
| *C08F 110/06* | (2006.01) | |
| *C08F 210/16* | (2006.01) | |
| *C08F 10/02* | (2006.01) | |
| *C08F 210/08* | (2006.01) | |

(52) U.S. Cl.
CPC ............ *C08F 110/06* (2013.01); *C08F 210/16* (2013.01); *B01J 2208/00274* (2013.01); *B01J 2219/0004* (2013.01); *B01J 2219/00254* (2013.01); *B01J 2219/1947* (2013.01)

(56) References Cited

U.S. PATENT DOCUMENTS

| | | | |
|---|---|---|---|
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati | |
| 4,530,912 A | 7/1985 | Pullukat et al. | |
| 4,532,313 A | 7/1985 | Matlack | |
| 4,543,399 A | 9/1985 | Jenkins, III et al. | |
| 4,544,020 A | 10/1985 | Chrysostome et al. | |
| 4,560,671 A | 12/1985 | Gross et al. | |
| 4,581,342 A | 4/1986 | Johnson et al. | |
| 4,657,882 A | 4/1987 | Karayannis et al. | |
| 5,539,067 A | 7/1996 | Parodi et al. | |
| 5,618,771 A | 4/1997 | Parodi et al. | |
| 6,413,477 B1 | 7/2002 | Govoni et al. | |
| 7,514,508 B2 * | 4/2009 | Meier et al. | 526/65 |
| 7,619,046 B2 * | 11/2009 | Broughton et al. | 526/88 |
| 2010/0056734 A1 * | 3/2010 | Karer et al. | 526/64 |

FOREIGN PATENT DOCUMENTS

| | | | |
|---|---|---|---|
| EP | 0045976 A2 | 2/1982 | |
| EP | 0045977 A2 | 2/1982 | |
| EP | 0629631 A2 | 12/1994 | |
| EP | 0629632 A2 | 12/1994 | |
| EP | 0688794 A1 | 12/1995 | |
| EP | 0696293 A1 | 2/1996 | |
| EP | 0699213 A1 | 3/1996 | |
| EP | 0776913 A2 | 6/1997 | |
| EP | 0810235 A2 | 12/1997 | |
| EP | 1074557 A2 | 2/2001 | |
| EP | 1739103 A1 | 1/2007 | |
| EP | 1752462 A1 | 2/2007 | |
| EP | 2082797 A1 | 7/2009 | |
| EP | 2090356 A1 | 8/2009 | |
| EP | 2090357 A1 | 8/2009 | |
| EP | 2446960 A1 | 5/2012 | |
| WO | 8707620 A1 | 12/1987 | |
| WO | 9219653 A1 | 11/1992 | |
| WO | 9219658 A1 | 11/1992 | |
| WO | 9219659 A1 | 11/1992 | |
| WO | 9221705 A1 | 12/1992 | |
| WO | 9311165 A1 | 6/1993 | |
| WO | 9311166 A1 | 6/1993 | |
| WO | 9319100 A1 | 9/1993 | |
| WO | 9425495 A1 | 11/1994 | |
| WO | 9512622 A1 | 5/1995 | |
| WO | 9532994 A1 | 12/1995 | |
| WO | 9632423 A1 | 10/1996 | |
| WO | 9704015 A1 | 2/1997 | |
| WO | 9728170 A1 | 8/1997 | |
| WO | 9736939 A1 | 10/1997 | |
| WO | 9812234 A1 | 3/1998 | |
| WO | 9832776 A1 | 7/1998 | |
| WO | 9840331 A1 | 9/1998 | |
| WO | 9912943 A1 | 3/1999 | |
| WO | 9933842 A1 | 7/1999 | |
| WO | 9942497 A1 | 8/1999 | |
| WO | 9951646 A1 | 10/1999 | |
| WO | 9961489 A1 | 12/1999 | |
| WO | 0021655 A2 | 4/2000 | |
| WO | 0026266 A1 | 5/2000 | |
| WO | 0029452 A1 | 5/2000 | |
| WO | 0155230 A1 | 8/2001 | |
| WO | 0179306 A1 | 10/2001 | |
| WO | 0187989 A1 | 11/2001 | |
| WO | 0202575 A1 | 1/2002 | |
| WO | 0202576 A1 | 1/2002 | |
| WO | 03000754 A2 | 1/2003 | |
| WO | 03000755 A2 | 1/2003 | |
| WO | 03000756 A2 | 1/2003 | |
| WO | 03000757 A2 | 1/2003 | |
| WO | 03010208 A1 | 2/2003 | |
| WO | 03051514 A1 | 6/2003 | |
| WO | 03051934 A1 | 6/2003 | |
| WO | 03106510 A1 | 12/2003 | |
| WO | 2004029112 A1 | 4/2004 | |
| WO | 2004085499 A2 | 10/2004 | |
| WO | 2004111095 A1 | 12/2004 | |
| WO | 2004111096 A1 | 12/2004 | |
| WO | 2005118655 A1 | 12/2005 | |
| WO | 2007025640 A1 | 3/2007 | |
| WO | 2009080660 A1 | 7/2009 | |
| WO | 2010057915 A1 | 5/2010 | |

OTHER PUBLICATIONS

J. Yerushalmi, "High Velocity Fluidized Beds", Gas Fluidization Technology, Chapter 7, pp. 155-196, J. Wiley & Sons, Ltd., 1986.

Olazar, et al., "Spouted Bed Reactors", Chem. Eng. Technol., 26 (2003), 8, pp. 845-852.

Pell, et al., "Gas-Solid Operations and Equipment", Section 17, Perry's Chemical Engineer's Handbook, vol. 8, 2008.

Feldman, "Selecting a lump breaker for gross size reduction", Powder and Bulk Engineering, Jun. 1987, pp. 26-29.

Stolhandske, "Breaking your lumps: Crushers and how to select one", Powder and Bulk Engineering, Jul. 1997, pp. 49-57.

Kirk Othmer, "Gas Cleaning", Encyclopaedia of Chemical Technology, 2nd Edition, vol. 10 (1966) pp. 340-342.

D. Geldhart, "Single Particles, Fixed and Quiescent Beds", Gad Fluidization Technology, Chapter 2, J. Wiley & Sons Ltd., 1986.

* cited by examiner

HIGH THROUGHPUT REACTOR ASSEMBLY FOR POLYMERIZATION OF OLEFINS

The invention relates to a fluidized-bed reactor assembly for the polymerisation of olefinic monomer(s), and to multi reactor assemblies comprising at least one fluidized bed reactor.

BACKGROUND

Gas phase reactors are commonly used for the polymerization of olefins such as ethylene and propylene as they allow relative high flexibility in polymer design and the use of various catalyst systems. A common gas phase reactor variant is the fluidized bed reactor. In polyolefin production, olefins are polymerized in the presence of a polymerization catalyst in an upwards moving gas stream. The fluidization gas is removed from the top of the reactor, cooled in a cooler, typically a heat exchanger, re-pressured and fed back into the bottom part of the reactor. The reactor typically contains a fluidized bed comprising the growing polymer particles containing the active catalyst located above a distribution plate separating the bottom and the middle zone of the reactor. The velocity of the fluidization gas is adjusted such that a quasi-stationary situation is maintained, i.e. the bed is maintained at fluidized conditions. In such a quasi-stationary situation, the gas and particle flows are highly dynamic. The required gas velocity mainly depends on the particle characteristics and is well predictable within a certain scale range. Care has to be taken that the gas stream does not discharge too much polymeric material from the reactor. This is usually accomplished by a so called disengagement zone. This part in the upper zone of the reactor is characterized by a diameter increase, reducing the gas velocity. Thereby the particles that are carried over from the bed with the fluidization gas for the most part settle back to the bed. Yet another fundamental problem with traditional fluidized bed reactors are the limitations as to the cooling capacity and entrainment due to the formation of huge bubbles. It should be mentioned that the presence of bubbles as such is desirable, since mixing is intensified thereby. However, bubble size should be much smaller than the diameter of the reactor. Increasing the bed level in conventional fluidized bed reactors for increasing the space-time yield leads to an increase of the bubble size and to an unwanted entrainment of material from the reactor. In conventional reactors there are no means for breaking up the bubbles.

Various modified gas phase reactor designs have been proposed. For example, WO-A-01/87989 has proposed a fluidized bed reactor without a distribution plate and an asymmetric supply of the reaction components to the reaction chamber.

M. Olazar has reported a spouted bed reactor in Chem. Eng. Technol., 26 (2003), 8, p. 845-852. In this reactor, a jet of fluids is introduced in a cylindrical or conical vessel containing solid. Under proper conditions, the jet penetrates the particles upwards through the spout. Recirculation takes place in the outer phase neighbouring the spout.

Dual reactor assemblies comprising two reactors are also known. WO 97/04015 discloses two coupled vertical cylindrical reactors, the first reactor being operated under fast fluidization conditions. The first reactor having a frustoconical bottom zone and a hemispherical upper zone is coupled with the second reactor being a settled bed reactor. The operation under fast fluidization conditions is done in a reactor having a ratio of length/equivalent cross-sectional diameter of about 5 or more.

WO-A-01/79306 discloses a gas phase reactor assembly comprising a reactor including a distribution grid coupled with a cyclone separating solids and gaseous material. The separated solids are recycled back to the reactor.

WO-A-2009/080660 reports the use of a gas phase reactor assembly as described in WO-A-97/04015 comprising two interconnected reactors and a separation unit, the first reactor being a so called riser and the second reactor being a so called downcomer. The first reactor is operated under fast fluidization conditions.

However, the fluidized bed reactors and the dual reactor assemblies comprising a fluidized bed reactor described in the prior art still have several disadvantages.

A first problem concerns the plugging of the underside of the distribution plates due to entrainment of fines carried over with the circulation gas. This effect lowers operational stability and stability of the quality of the polymer. This problem partially can be overcome by lower fluidization gas velocity. However, a relatively low fluidization gas velocity limits the production rate and can lead to the formation of sheets, chunks and lumps in the production of polyolefins. This conflict of aims usually has been countered by the incorporation of a disengagement zone. However, disengagement zones again limit the production rate of a gas phase reactor of fixed size, as there is the need for additional top space above the top level of the fluidized bed during operation. In industrial dimensions, the volume of the disengagement zone often amounts to more than 40% of the total volume of the reactor and insofar requires the construction of unnecessary huge reactors.

A second problem concerns the bubbling. Conventional fluidized bed reactors typically operate in a bubbling regime. A part of the fluidization gas passes the bed in the emulsion phase where the gas and the solids are in contact with each other. The remaining part of the fluidization gas passes the bed in the form of bubbles. The velocity of the gas in the bubbles is higher than the velocity of the gas in the emulsion phase. Further, the mass and heat transfer between the emulsion phase and the bubbles is limited, especially for large bubbles having a high ratio of volume to surface area. Despite the fact that the bubbles positively contribute to powder mixing, formation of too large bubbles is undesired because the gas passing through the bed in the form of bubbles does not contribute to the heat removal from the bed in the same way as the gas in the emulsion phase and the volume occupied by the bubbles does not contribute to the polymerization reaction.

Yet a further problem concerns the elimination of sheets, chunks and lumps. Complete absence of sheets, chunks and lumps is rather difficult to achieve in standard reactors. Typically the sheets, chunks and lumps are removed above the distribution plate by additional outlets and receiver units which can get plugged and anyway do not allow a full removal of the sheets, chunks and lumps.

Thus there is still the need for improved reactor design. The present invention aims to overcome the disadvantages of the reactor designs known in the prior art and particularly aims to avoid the segregation of fines at a high production rate. The present invention further aims at avoiding low productivity zones in the reactor. Moreover, the present invention concerns the provision of a reactor, allowing high operational stability and at the same time production of polymer having highest quality. In yet another aspect, the present invention aims at a reactor assembly minimizing the formation of sheets, chunks and lumps.

SUMMARY OF THE INVENTION

The present invention is based on the finding that these problems can be overcome by a fluidized bed reactor having decreasing cross-sectional area in the upper zone.

The present invention insofar provides a reactor assembly for the production of polymers including a fluidized bed reactor (1) comprising a bottom zone (5), a middle zone (6) and an upper zone (7), an inlet (8) for the fluidization gas located in the bottom zone (5), an outlet (9) for the fluidization gas located in the upper zone (7);

the outlet (9) for the fluidization gas being coupled with the fluidized bed reactor (1) via inlet (8) via a gas circulation line;

means for separation of solids from gas (2) being connected to said gas circulation line;

the equivalent cross-sectional diameter of the upper zone (7) being monotonically decreasing with respect to the flow direction of the fluidization gas through the fluidized bed reactor;

the middle zone (6) having an essentially constant equivalent cross-sectional diameter with respect to the flow direction of the fluidization gas through the fluidized bed reactor;

characterized in that the ratio of the height of the fluidized bed reactor to the equivalent cross-sectional diameter of the middle zone of the fluidized bed reactor is from 2 to 10; and characterized in that said upper zone (7) is directly connected to said middle zone (6).

The present invention further provides a reactor assembly comprising a moving bed reactor (15) having a lower section (16), and an upper section (17), an inlet (18) for the barrier gas, an inlet (19) for solids, and an outlet (20) for gas being located in the upper section (17), an outlet (21) for withdrawing solids from the moving bed reactor; the outlet (21) of the moving bed reactor being coupled with inlet (23) of the fluidized bed reactor (1) with optional feeding means for solids (22) located between;

the means for gas/solids separation (2) being coupled with the moving bed reactor (15) via inlet (19).

The present invention further provides a process for the production of polymers in the presence of a polymerization catalyst in a reactor assembly including a fluidized bed reactor according to the present invention, the process comprising:

feeding a gas mixture comprising at least one monomer into the bottom zone of said fluidized bed reactor;

withdrawing a combined stream of gas and solids from the upper zone of said fluidized bed reactor so as to produce an upwards flowing gas stream within said fluidized bed reactor;

passing said combined stream to means for gas/solids separation;

withdrawing an overhead stream comprising less than 2% by weight of solids from said gas/solids separation and directing said overhead stream comprising less than 2% by weight of solids into the bottom zone;

feeding polymerization catalyst into said fluidized bed reactor;

polymerizing said at least one monomer in the presence of said polymerization catalyst to form a fluidized bed of polymer particles supported by said upwards flowing gas stream;

characterized in that said fluidized bed occupies at least 70% of the combined volume of the middle zone and the upper zone of said fluidized bed reactor.

In yet another aspect, the present invention provides a process for the production of polymers in the presence of a polymerization catalyst in a reactor assembly, including a fluidized bed reactor (1) comprising a gas entry section a first domain, wherein the superficial gas velocity of the fluidization gas is essentially constant, and a second domain being located above the first domain, wherein the superficial gas velocity of the fluidization gas is higher relative to the superficial gas velocity in the first domain, an inlet for the fluidization gas located in a gas entry section, an outlet for the fluidization gas located in the second domain; the outlet for the fluidization gas being coupled with the fluidized bed reactor via a gas circulation line; means for separation of solids from gas being connected to said gas circulation line, the process comprising:

feeding a gas mixture comprising at least one monomer via the gas entry section into the first domain of said fluidized bed reactor;

feeding polymerization catalyst into said fluidized bed reactor;

polymerizing said at least one monomer in the presence of said polymerization catalyst to form a fluidized bed of polymer particles supported by said upwards flowing gas stream;

passing said combined stream to gas/solids separation means;

withdrawing an overhead stream comprising less than 2% by weight of solids from said separation step and directing said overhead stream comprising less than 2% by weight of solids into said gas entry section.

DETAILED DESCRIPTION OF THE INVENTION

Definitions

An overview of different types of fluidization and different fluidization regimes is given, for instance, in section 17 of Perry's Chemical Engineers' Handbook, vol 8 (McGraw-Hill, 2008). FIG. 17-3 in Perry's shows that conventional bubbling fluidized beds typically operate at superficial gas velocities between the minimum fluidization velocity and the terminal velocity. The turbulent beds operate at a gas velocity being close to the terminal velocity. The transport reactors and circulating beds operate at gas velocities significantly higher than the terminal velocity. Bubbling, turbulent and fast fluidized beds are clearly distinguishable and they are explained in more detail in Perry's, on pages 17-9 to 17-11 incorporated by reference herewith. Calculation of minimum fluidization velocity and transport velocity is further discussed in Geldart. Gas Fluidization Technology, page 155, et seqq, J Wiley & Sons Ltd, 1986. This document is incorporated by reference.

Fluidized bed reactors are well known in the prior art. In fluidized bed reactors the fluidization gas is passed through the fluidized bed within a certain superficial velocity. The superficial velocity of the fluidization gas must be higher than the fluidization velocity of the particles contained in the fluidized bed as otherwise no fluidization would occur. However, the superficial velocity should be substantially lower than the onset velocity of pneumatic transport, as otherwise the whole bed would be entrained with the fluidization gas. An overview is given, for instance, in Perry's, pages 17-1 to 17-12, or M Pell, Gas Fluidization (Elsevier, 1990), pages 1 to 18 and in Geldart, Gas Fluidization Technology, J Wiley & Sons Ltd, 1986.

The means for separation of solids from gas (2) allow separation of gas and solids, particularly powder. In the simplest embodiment this can be a vessel where the solids, particularly polymer settles by gravity. However, usually the means for gas/solids separation are at least one cyclone. A cyclone used in the reactor assembly according to the present in its simplest form is a container in which a rotating flow is established. Cyclone design is well described in the literature. Particularly suitable cyclones are described in documents Kirk-Othmer, Encyclopaedia of Chemical Technology, 2nd edition (1966), Volume 10, pages 340-342 being incorporated by reference herewith.

Means for cooling (3) are required in view of the exothermic nature of the polymerization reactions. Usually the means for cooling will be in the form of a heat exchanger.

Means for pressurizing (4) enable the adjustment of the fluidization gas velocity. They are typically compressors.

The fluidized bed reactor comprises a bottom zone (5), a middle zone (6) and an upper zone (7). These zones form the actual reaction zone denoting the room within the fluidized bed reactor designated for the polymerization reaction. However, one skilled in the art will understand that the polymerization reaction will go on as long as the catalyst remains active and there is monomer to polymerize. Thus chain growths can also occur outside the actual reaction zone. For example, polymer collected in a collection vessel will still polymerize further.

The terms bottom-, middle- and upper zone indicate the relative position with respect to the base of the fluidized bed reactor. The fluidized bed reactor vertically extends in upward direction from the base, whereby the cross-section(s) of the fluidized bed reactor are essentially parallel to the base.

The height of the fluidized bed reactor is the vertical distance between two planes with the lower plane crossing the lowest point of the bottom zone and the upper plane crossing the highest point of the upper zone. The vertical distance denotes the distance along a geometrical axis forming a 90° angle with the base and also the two planes, i.e. a gas entry zone (if present) shall as a matter of definition contribute to the height of the fluidized bed reactor. The height of the individual zones is the vertical distance between the planes limiting the zones.

The term cross-section as used herein denotes the area of the intersection with a plane being parallel to the base. If not mentioned otherwise, the term cross-section always concerns the inner cross-section without internals. For example if the middle zone is cylindrical having an outer diameter of 4.04 m and the wall of the cylinder has a thickness of 0.02 m, the inner diameter will be 4.00 m, whereby the cross-section will be $2.0 \times 2.0 \times \pi$ m$^2 \approx 12.6$ m$^2$.

The term free cross-section denotes the area of the total cross-section allowing interchange of gases and particles. In other words, in a sectional drawing with the section going through the plane formed by the interphase plane of the cross-section of the bottom zone and the cross-section of the middle zone, the free cross-section is the area, which is unobstructed.

Having an essentially constant equivalent cross-sectional diameter denotes an equivalent cross-sectional diameter having a variation of below 5%.

Variation shall mean the difference of the equivalent cross-sectional diameter maximum and the equivalent cross-sectional diameter minimum versus the average equivalent diameter. For example, if the maximum equivalent cross-sectional diameter was 4.00 m, the minimum equivalent cross-sectional diameter was 3.90 m, and the average equivalent cross-sectional diameter was 3.95 m variation would be (4.00-3.90) m/3.95 m=0.025, i.e. 2.5%.

Monotonically decreasing is to be understood in a mathematical sense, i.e. the average diameter will decrease or will be constant with respect to the flow direction of the fluidization gas through the fluidized bed reactor. Monotonically decreasing equivalent cross-sectional diameter includes two situations namely the decrease of the equivalent cross-sectional diameter with respect to the flow direction of the fluidization gas through the fluidized bed reactor and also constancy of the equivalent cross-sectional diameter with respect to the flow direction of the fluidization gas. It should be understood, however, that even though a zone having a monotonically decreasing diameter in the direction of flow may have sections having an essentially constant diameter, the diameter at the downstream end of the zone is always smaller than the diameter at the upstream end of the zone.

By "strictly monotonically decreasing" it is meant that the equivalent cross-sectional diameter will decrease with respect to the flow direction of the fluidization gas through the fluidized bed reactor. Thus, if a zone has a strictly monotonically decreasing diameter in the direction of flow then at any point h of the zone the diameter is smaller than at any other point upstream of said point h.

The phrases "monotonically increasing" and "strictly monotonically increasing" are to be understood correspondingly.

Equivalent cross-sectional diameter is the normal diameter in case of circular cross-section. If the cross-section is not circular, the equivalent cross-sectional diameter is the diameter of a circle having the same area as the cross-section of the non-circular cross-section embodiment.

As a matter of definition, the three reaction zones, bottom zone, middle zone and upper zone shall differentiate as to their equivalent cross-sectional diameter. In other words, the boundary plane delimiting bottom zone and middle zone shall be the plane, where the cross-sectional diameter changes from increasing values to essentially constant values. The boundary plane delimiting middle zone and upper zone shall be the plane, where the cross-sectional diameter changes from essentially constant values to decreasing values. In the subsequent text "diameter" is also used in the meaning of "equivalent cross-sectional diameter" for non-circular surfaces.

Cone geometry plays an important role for the present invention. A cone is a three-dimensional geometric shape that tapers smoothly from a flat to the apex. This flat usually will be a circle but may also be elliptic. All cones also have an axis which is the straight line passing through the apex, about which the lateral surface has a rotational symmetry.

From a more functional perspective, the fluidized bed reactor according to the present invention includes a gas entry section, a first domain, wherein the superficial gas velocity of the fluidization gas is essentially constant, and a second domain being located above the first domain, wherein the superficial gas velocity of the fluidization gas is higher relative to the first domain, an inlet for the fluidization gas located in the gas entry section, an outlet for the fluidization gas located in the second domain; the outlet for the fluidization gas being coupled with the fluidized bed reactor via a gas circulation line; and means for separation of solids from gas being connected to said gas circulation line.

The gas entry section is the part of the reactor where the fluidization gas enters the reactor. In this section, the bed is formed.

The first domain is the part of the reactor where the superficial gas velocity of the fluidization gas is essentially constant.

The second domain is located above the first domain and is the part of the reactor where the superficial gas velocity of the fluidization gas is higher relative to the superficial gas velocity in the first domain.

An overhead stream comprising less than 2% by weight of solids means that 98% or more by weight of the stream is present in gaseous form under the conditions typically required for operation.

Gas velocity shall mean the superficial gas velocity.

Gas entry section denotes the part of the whole apparatus, where the feed takes place and the bed is formed. The gas entry section insofar differentiates from the so called first domain and second domain.

The first domain denotes the part of the fluidized bed reactor, where the superficial gas velocity of the fluidization gas is essentially constant.

The second domain is located vertically above the first domain and denotes the part of the fluidized bed reactor, where the superficial gas velocity of the fluidization gas is higher than in the superficial gas velocity in the first domain.

"Directly connected" means that two zones are directly adjacent.

Overhead stream is a stream that is taken from the means of gas/solids separation such as a cyclone. When a cyclone is used, the overhead stream is originates from the upper stream, i.e. not the underflow or bottom stream.

DESCRIPTION

The new reactor assembly has various advantages. In a first aspect, there is no disengagement zone. This leads to an economical construction. The reactor can be operated so that the bed occupies almost the total volume of the reactor. This enables higher output/reactor size ratios further leading to substantial cost reduction. Further the polymer is evenly distributed within the reactor over the bed area and is accompanied by better coalescence of gas bubbles. It further has been surprisingly found that the solids flow vicinal to the walls of the reactor is high which leads to a constant cleaning of the walls particularly in the upper zone. In another aspect, it has been surprisingly found that within the reactor assembly the entrainment of fines with the fluidization gas is reduced as the undesirably large bubbles are destroyed. Further, the heat removal from the polymer as a function of bed height is more even and there is a better dispersion between the gas and the polymer as in the prior art reactors and processes.

A further important advantage of the present invention is that the separation of the polymer from the fluidization gas, for instance by using a cyclone, can easily be done due to a high concentration of solids in the fluidization gas. It has been surprisingly found that the solids content in the fluidization gas after the gas/solid separation is much lower in the present invention compared with a plant/process resulting in a feed to the gas/solids separation means characterized by a lower amount of solids. In other words, the relatively high amount of solids before the gas/solid separation in the present invention surprisingly results to a better degree of separation of solids.

It is preferred that the reactor assembly according to the present invention comprises an inlet for the catalyst or catalyst containing prepolymer. In the simplest embodiment, the catalyst or catalyst containing prepolymer may be fed via the inlet for the fluidization gas. However, a separate inlet for the catalyst or catalyst containing prepolymer allows good mixing of the catalyst into the bed. Most preferably the catalyst is fed to the most turbulent zone.

In one embodiment, the reactor assembly according to the present invention preferably comprises an outlet for the removal of sheets, chunks and lumps. Though the formation rate for sheets, chunks and lumps is extremely low, it is not possible to suppress the formation thereof to zero under all reaction conditions. If present the outlet for the removal of sheets, chunks and lumps will be preferably located in the lowest part of the bottom zone. In the most preferred embodiment, the outlet will be positioned in the centre of the bottom zone. When the bottom zone has conical shape, the outlet will preferably fall together with the apex of the cone.

In a second embodiment, the outlet for the removal of sheets, chunks and lumps is accompanied by means for the break-up of sheets, chunks and/or lumps. Such means for break-up of sheets, chunks and/or lumps are commercially available and they are discussed, among others, in Stolhandske, Powder and Bulk Engineering, July 1997 issue on pages 49-57 and Feldman, Powder and Bulk Engineering, June 1987 issue on pages 26-29 both documents being incorporated by reference herewith.

As explained above, the fluidized bed reactor according to the present invention comprises three zones, a bottom zone (5), a middle zone (6) and an upper zone (7).

In a first and preferred embodiment the fluidized bed reactor according to the present invention consists of three zones, a bottom zone (5), a middle zone (6) and an upper zone (7).

In a second embodiment, the fluidized bed reactor according to the present invention comprises more than three zones, a bottom zone (5), a middle zone (6) and an upper zone (7) and at least one additional zone, whereby this at least one additional zone is located below the bottom zone (5) with respect to the flow direction of the fluidization gas. Such an additional zone is shown in FIG. 4.

The equivalent cross-sectional diameter of the upper zone preferably is strictly monotonically decreasing with respect to the flow direction of the fluidization gas, i.e. generally in upwards vertical direction.

The middle zone of the fluidized bed reactor typically will be in the form of a circular cylinder being denoted herein simply cylinder. However, it is possible that the middle zone of the fluidized bed reactor is in the form of an elliptic cylinder. Then the bottom zone preferably is preferably in the form an oblique cone. Then more preferably the upper zone is also in the form of an oblique cone.

From a more functional perspective, the middle zone will essentially form the first domain wherein the superficial gas velocity of the fluidization gas is essentially constant. The upper zone will essentially form the second domain wherein the superficial gas velocity of the fluidization gas is higher relative to the first domain.

The upper zone of the reactor assembly according to the present invention is preferably shaped such that a gas-particle stream vicinal to the inner walls is created, whereby the gas-particle stream is directed downwards to the base. This gas-particle stream leads to an excellent particle-gas distribution and to an excellent heat balance. Further the high velocity of the gas and particles vicinal to the inner walls minimizes lump- and sheet formation.

It is further preferred that the ratio of the height of the upper zone to the diameter of the middle zone is within the range of from 0.3 to 1.5, more preferably 0.5 to 1.2 and most preferably 0.7 to 1.1.

It is particularly preferred that the reactor assembly according to the present invention includes an upper zone being cone-shaped and a middle zone being cylindrical shaped. The cone forming the upper zone preferably is a right circular cone and the cylinder forming the middle zone preferably is a circular cylinder.

More preferably the cone-angle of the cone-shaped upper zone is 10° to 50°, most preferably 20 to 40°. As defined above, the cone-angle is the angle between the axis of the cone and the lateral area (FIG. 3).

The specific cone-angles of the cone-shaped upper zone further improve the tendency for back-flow of the particles countercurrent to the fluidization gas. The resulting unique pressure balance leads to an intensive break up of bubbles, whereby the space-time-yield is further improved. Further as mentioned above, the wall flow velocity, i.e., the velocity of particles and gas vicinal to the inner walls is high enough to avoid the formation of lumps and sheets.

The reactor assembly according to the present invention preferably has a bottom zone shaped such that the particles distribute the gas over the whole cross-section of the bed. In other words, the particles act as a gas distribution grid. In the bottom zone gas and solids are mixed in highly turbulent conditions. Because of the shape of the zone, the gas velocity gradually decreases within said bottom zone and the conditions change so that a fluidized bed is formed.

The following specifically preferred reactor geometries can be combined with the aforementioned first embodiment consisting of three zones a bottom zone (5), a middle zone (6) and an upper zone (7) and the second embodiment including at least one additional zone, whereby this zone or these zones is/are located below the bottom zone.

Preferably, the equivalent cross-sectional diameter of the bottom zone (5) is monotonically increasing with respect to the flow direction of the fluidization gas through the fluidized bed reactor. As the flow direction of the fluidization gas is upwards with respect to the base, the equivalent cross-sectional diameter of the bottom zone is vertically monotonically increasing. Monotonically increasing is to be understood in a mathematical sense, i.e. the average diameter will increase or will be constant with respect to the flow direction of the fluidization gas through the fluidized bed reactor.

The equivalent cross-sectional diameter of the bottom zone preferably is strictly monotonically increasing with respect to the flow direction of the fluidization gas through the reactor, i.e. generally vertically upwards.

More preferably, the bottom zone is cone-shaped and the middle zone is cylindrical shaped.

The bottom zone preferentially has right circular cone shape and the middle zone is in the form of a circular cylinder. Alternatively the middle zone is in the form of an elliptic cylinder and the bottom and the upper zone are in the form oblique cones.

More preferably, the cone-angle of the cone-shaped bottom zone is 5° to 30°, even more preferably 7° to 25° and most preferably 9° to 18°, whereby the cone-angle is the angle between the axis of the cone and the lateral surface (FIG. 2).

It is further preferred that the equivalent diameter of the bottom zone increases from about 0.1 to about 1 meters per one meter of height of the bottom zone. More preferably, the diameter increase from 0.15 to 0.8 m/m and in particular from 0.2 to 0.6 m/m.

The preferred cone-angles lead to additional improved fluidization behavior and avoid the formation of stagnant zones. As a result, the polymer quality and stability of the process are improved. Especially, a too wide cone-angle leads to an uneven fluidization and poor distribution of the gas within the bed. While an extremely narrow angle has no detrimental effect on the fluidization behavior it anyway leads to a higher bottom zone than necessary and is thus not economically feasible.

However, as mentioned above, in a second embodiment, there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

Preferably, there is an unobstructed passageway in the direction of flow of the fluidization gas through the fluidized bed reactor between the bottom zone (5) and the upper zone (7). An unobstructed passageway includes all geometries which allow substantially free exchange of gas and particles between and within said zones. An unobstructed passageway is characterized by the absence of internals such as distribution plates or grids resulting in substantially increased flow resistivity. An unobstructed passageway is characterized by a ratio of the free cross-section/total cross-section with respect to the partition between the bottom zone and the middle zone of at least 0.95, whereby the free cross-section is the area allowing interchange of gases and whereby the total cross-section is the area of the inner reactor cross section limited by the walls of the fluidized bed reactor.

This shall be explained by way of an example. When the middle zone has cylindrical form with an inner diameter of 4 meter, the total cross-section is about $2.0 \times 2.0 \times \pi \, m^2 \approx 12.6 \, m^2$. If the area of the free cross-section, i.e. the area allowing interchange of gases is at least $12.0 \, m^2$ the criteria for an unobstructed passageway will be fulfilled. A typical example for an internal leading to a small reduction as to the cross-section allowing interchange of gases and solids is a vertical pipe. Such a pipe or a plurality of pipes directs flow and insofar has guiding function. However, as the wall thickness of the pipe (and fasteners) only limit the cross-section to a very small degree, the interchange of gases and solids will be essentially not limited.

The fluidized bed reactor assembly according to the present invention can be used for producing polymers in a commercial scale, for instance with a production capacity of from 2 to 40 tons per hour or 10 to 30 tons per hour.

The reactor assembly according to the present invention preferably includes means for injection of the fluidization gas with an injection angle within the range of 120° to 150° with respect to the vertical axis of the fluidized bed reactor. The vertical axis forms a 90° angle with the base. More preferably the means for injection of the fluidization gas enable an injection angle in the range of 130° to 140°.

Moreover the reactor assembly according to the present invention preferably comprises an outlet for the polymer. In the simplest variant of the reactor assembly, the polymer can be withdrawn via the cyclone. The outlet for the polymer preferably is located in the middle zone. More preferably the outlet is in the form of a nozzle. Typically there will be numerous nozzles located in the middle zone.

Advantageously, the polymer is withdrawn directly from the fluidized bed, meaning that the outlet nozzle withdraws polymer from a level which is above the base of the fluidized bed but below the upper level of the fluidized bed. It is preferred to withdraw the polymer continuously, as described in WO 00/29452. However, it is also possible to withdraw from circulation gas line which withdraws the fluidization gas from the top of the reactor. The polymer is then suitably separated from the gas stream, for instance, using a cyclone. Also a combination of the two methods discussed above can be used so that a part of the polymer is withdrawn directly from the bed and another part from circulation gas line.

The circulation gas is cooled in order to remove the heat of polymerization. Typically, this is done in a heat exchanger. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543, 399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

When producing olefin polymers in the presence of olefin polymerization catalysts the superficial gas velocity in the middle zone is suitably within a range of from 5 to 80 cm/s (or, from 0.05 to 0.8 m/s).

The reactor may be used for polymerizing monomers in the presence of a polymerization catalyst. Monomers which can thus be polymerized include olefins, diolefins and other polyenes. The reactor may thus be used to polymerize ethylene, propylene, 1-butene, 1-pentene, 1-hexene, 4-methyl-1-pentene, 1-heptene, 1-octene, 1-decene, styrene, norbornene, vinyl norbornene, vinylcyclohexane, butadiene, 1,4-hexadiene, 4-methyl-1,7-octadiene, 1,9-decadiene and their mixtures. Especially, the reactor is useful in polymerizing ethylene and propylene and their mixtures, optionally together with other alpha-olefin comonomers having from 4 to 12 carbon atoms.

In addition to the monomers different co-reactants, adjuvants, activators, catalysts and inert components may be introduced into the reactor.

Any polymerization catalyst may be used to initiate and maintain the polymerization. Such catalysts are well known in the art. Especially the catalyst should be in the form of a particulate solid on which the polymerization takes place. Suitable catalysts for olefin polymerization are, for instance, Ziegler-Natta catalysts, chromium catalysts, metallocene catalysts and late transition metal catalysts. Also different combinations of two or more such catalysts, often referred to as dual site catalysts, may be used.

Examples of suitable Ziegler-Natta catalysts and components used in such catalysts are given, for instance, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, WO-A-92/19659, WO-A-92/19653, WO-A-92/19658, U.S. Pat. Nos. 4,382,019, 4,435,550, 4,465,782, 4,473,660, 4,560,671, 5,539,067, 5,618,771, EP-A-45975, EP-A-45976, EP-A-45977, WO-A-95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882, EP-A-688794, WO-A-99/51646, WO-A-01/55230, WO-A-2005/118655, EP-A-810235 and WO-A-2003/106510.

Examples of suitable metallocene catalysts are shown in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462, EP-A-1739103, EP-A-629631, EP-A-629632, WO-A-00/26266, WO-A-02/002576, WO-A-02/002575, WO-A-99/12943, WO-A-98/40331, EP-A-776913, EP-A-1074557 and WO-A-99/42497, The catalysts are typically used with different activators. Such activators are generally organic aluminium or boron compounds, typically aluminium trialkyls, alkylaluminium halides, alumoxanes In addition different modifiers, such as ethers, alkoxysilanes, and esters and like may be used.

Further, different coreactants, may be used. They include chain transfer agents, such as hydrogen and polymerization inhibitors, such as carbon monoxide or water. In addition, an inert component is suitably used. Such inert component may be, for instance, nitrogen or an alkane having from 1 to 10 carbon atoms, such as methane, ethane, propane, n-butane, isobutane, n-pentane, isopentane, n-hexane or like. Also mixtures of different inert gases may be used.

The polymerization is conducted at a temperature and pressure where the fluidization gas essentially remains in vapour or gas phase. For olefin polymerization the temperature is suitably within the range of from 30 to 110° C., preferably from 50 to 100° C. The pressure is suitably within the range of from 1 to 50 bar, preferably from 5 to 35 bar.

The reactor is preferably operated in such conditions that the bed occupies at least 70% of the combined volume of the middle zone and the upper zone, more preferably at least 75% and most preferably at least 80%. The same numbers hold for the inventive processes according to the present invention. When the reactor is operated in this manner it has been found that surprisingly the bubbles break up at the upper part of the reactor or are prevented from growing. This is advantageous for a number of reasons. First, when the volume occupied by the bubbles is reduced, the volume of the reactor is more effectively used for the polymerization and the "dead" volume is reduced. Second, the absence of large bubbles reduces the entrainment of fines from the reactor. Instead, the polymer that is carried out of the reactor with the fluidization gas represents the total polymer within the reactor. Therefore, it is possible to separate the polymer from the fluidization gas, for instance by using a cyclone, and withdraw this polymer as the product or direct it into further polymerization stages. Third, even though polymer is entrained from the reactor together with the fluidization gas, the polymer is surprisingly easier to separate from the fluidization gas than if the amount of polymer were smaller. Therefore, when the fluidization gas withdrawn from the top of the reactor is passed through a cyclone the resulting overhead stream surprisingly contains a smaller amount of polymer than in a conventional fluidized bed reactor equipped with a similar cyclone. Thus the reactor assemblies and the processes according to the present invention combine a fluidized bed reactor and means for separation of solids/gas in a synergistic way. Furthermore, the underflow stream has better flow properties and is less prone for plugging than in a similar conventional process.

The fluidization gas withdrawn from the top of the reactor is directed to a separation step. As discussed above, this is conveniently performed in a cyclone. In a cyclone the gas stream containing particles enters a cylindrical or conical chamber tangentially at one or more points. The gas leaves through a central opening at the top of the chamber (overhead) and the particles through an opening at the bottom (underflow). The particles are forced by inertia towards the walls of the cyclone from where they fall downwards. Typically, the overhead contains less than 2% by weight or less than 1% by weight, preferably less than 0.75% and more preferably less than 0.5% by weight of solid material, particularly polymer particles. The underflow typically contains mainly solid material and includes some gas between the particles.

In a preferred embodiment the fluidization gas enters into the gas entry zone below the bottom zone of the fluidized fed reactor. In said gas entry zone the gas and eventual polymer or catalyst particles are mixed in turbulent conditions. The velocity of the fluidization gas is such that the eventual catalyst or polymer particles contained therein are transferred into the bottom zone. However, polymer agglomerates, such as lumps or sheets, fall downwards and may be thus removed from the reactor. In a typical embodiment the gas entry zone is a pipe typically having a diameter such that the gas velocity is higher than about 1 m/s, such as from 2 to 70 m/s, preferably from 3 to 60 m/s. It is also possible that the gas entry zone has an increasing diameter in the flow direction so that the gas velocity at the upper part of the gas entry zone is lower than at the bottom part.

In the preferred embodiment discussed above the gas enters from the gas entry zone to the bottom zone. A gas entry zone as a matter of definition shall not be seen as part of the reactor and insofar shall not contribute to the height of the reactor. Within the bottom zone the fluidized bed is formed. The gas velocity is gradually reduced so that at the top of the bottom zone the superficial gas velocity is from about 0.02 m/s to about 0.9 m/s, preferably from 0.05 to about 0.8 m/s and more preferably from about 0.07 to about 0.7 m/s, such as 0.5 m/s or 0.3 m/s or 0.2 m/s or 0.1 m/s, Further, in the above-mentioned preferred embodiment the superficial velocity of the fluidization gas decreases in the bottom zone preferably so that the value of a, which is the reciprocal of the square root of the superficial velocity, expressed in m/s, $$a = \frac{1}{\sqrt{v}},$$

wherein v is the superficial velocity of the fluidization gas, increases by a value within the range of from 0.66 to 4.4 per one meter length of the bottom zone. More preferably the value of a as defined above increases by a value within the range of from 0.94 to 3.6, even more preferably from 1.2 to 2.5 per one meter length of the bottom zone. Naturally, the value of a increases in the direction of the flow of the fluidization gas within the bottom zone, that is, in the upwards direction.

Preferably the superficial velocity of the fluidization gas monotonously decreases within the bottom zone, remains at a constant level within the middle zone and monotonously increases within the upper zone. Especially preferably, the superficial velocity increases as described above.

The present invention is further concerned with a dual reactor assembly for the production of polymers including a fluidized bed reactor (1), a means for gas/solids separation (2), a moving bed reactor (15), means for cooling (3, 24), and means for pressurizing (4, 25);

the fluidized bed reactor (1) comprising a bottom zone (5), a middle zone (6) and an upper zone (7), an inlet (8) for the fluidization gas located in the bottom zone (5), and an outlet (9) located in the upper zone (7);

the moving bed reactor (15) having a lower section (16) and an upper section (17), an inlet (18) for the barrier gas, an inlet (19) for solids, and an outlet (20) for gas being located in the upper section (17), an outlet (21) for withdrawing solids from the moving bed reactor; the outlet (21) of the moving bed reactor being coupled with inlet (23) of the fluidized bed reactor (1) with optional feeding means for solids (22) located between;

the outlet (9) being coupled with the means for gas/solids separation (2), the means for gas/solids separation (2) being coupled with the moving bed reactor (15) via inlet (19), the middle zone (6) having an essentially constant equivalent cross-sectional diameter with respect to the flow direction of the fluidization gas through the fluidized bed reactor;

the equivalent cross-sectional diameter of the upper zone (7) being monotonically decreasing with respect to the flow direction of the fluidization gas through the fluidized bed reactor, characterized in that the ratio of the height of the fluidized bed reactor to the equivalent cross-sectional diameter of the middle zone of the fluidized bed reactor is from 2 to 10; and characterized in that said upper zone (7) is directly connected to said middle zone (6).

The dual reactor assembly is a combination of the reactor assembly described above with a moving bed reactor. All definitions and preferred embodiment as described above also apply with respect to the dual reactor assembly. These definitions and preferred embodiments are incorporated by reference herewith.

The lower section (16) of the moving bed reactor preferably is the lower part of the moving bed reactor contributing to 50% of the total volume of the moving bed reactor. The upper section (17) of the moving bed reactor preferably is the upper part of the moving bed reactor contributing to 50% of the total volume of the moving bed reactor.

The dual reactor assembly according to the present invention shows additional advantages beyond the advantage of the reactor assembly described above. It should be mentioned that the advantages of the reactor assembly described above are not lost. In a first aspect, the dual reactor configuration allows simple production of polyolefins having tailored molecular weight distribution by the use of different reaction conditions in the first and the second reactor. Moreover, the dual reactor assembly allows avoiding the incorporation of fines into growing polymer particles.

The dual reactor assembly is a combination of the reactor assembly described above with a moving bed reactor. All definitions and preferred embodiment as described above also apply with respect to the dual reactor assembly. These definitions and preferred embodiments are incorporated by reference herewith.

As discussed above, the polymer entrained by the fluidization gas from the fluidized bed reactor is passed through separation means, preferably through a cyclone. The polymer is separated from the gas and a purified gas stream as an overhead stream and a stream of solids is withdrawn as a bottom stream. As discussed above, the polymer in the stream of solids represents the overall polymer within the fluidized bed and therefore it can be withdrawn as a product stream and directed to downstream operations, such as into a moving bed reactor.

The moving bed reactor according to the present invention has a lower section and an upper section. From a functional perspective the lower section is mainly the section of polymerization and collecting the produced polymer. The upper section is mainly the section for withdrawing the gas from the moving bed reactor. Preferred moving bed reactors are disclosed in more detail in WO-A-2004/111095 and WO-A-2004/111096 incorporated by reference herewith.

The moving bed reactor according to the present invention preferably has an inlet for the barrier gas. The inlet for the barrier gas is preferably located in the lower section of the moving bed reactor. More preferably the inlet for the barrier gas is located in a height of less than 40% of the total height of the moving bed reactor. The barrier gas makes it possible to operate the fluidized bed reactor and the moving bed reactor independently from each other. The flow of the barrier gas prevents the fluidization gas from entering the moving bed reactor and disturbing the reaction conditions therein. The barrier gas further allows easy cooling of the moving bed reactor. In particular, the barrier gas may include liquid components which are vaporized in the moving bed reactor thereby cooling the bed.

The moving bed reactor according to the present invention further includes an inlet for solids. This inlet for solids preferentially is used for feeding particles separated in the cyclone. However, it is also possible to initiate the polymerization by feeding pre-polymer to the moving bed reactor via the inlet.

The moving bed reactor according to the present invention further includes an outlet for the fluidization gas being preferentially located in the upper section.

Moreover, the moving bed reactor includes an outlet for withdrawing solids from the moving bed reactor. This outlet is preferably coupled with a solids inlet of the fluidized bed reactor.

Feeding the solids from the moving bed reactor to the fluidized bed reactor is effected by feeding means. In the simplest form, the feeding means are a simple gravity chute preferentially controllable by adjustable valves. However, it is preferred that the feed is effected by a screw. Suitable methods for feeding the solids are disclosed in EP-A-2090357, EP-A-2090356, EP-A-2082797 and a copending European Patent Application No. 10075723.6. These documents are incorporated by reference. Preferably the feed pipe comprises a densification zone between the outlet of the screw and the fluidized bed reactor to prevent the fluidization gas from entering the moving bed reactor through the screw feeder.

The ratio of the volume of the fluidized bed reactor/volume of the moving bed preferentially is in the range of 50/1 to 3/1, preferably 30/1 to 5/1.

The polymer, together with a small amount of fluidization gas is directed to the upper part of the moving bed reactor. The polymer settles in the reactor to form a bed of polymer particles. From the bottom of the moving bed polymer is withdrawn to form an exit stream of polymer from the moving bed reactor. Said exit stream may be withdrawn as the polymer product and be directed into downstream operations, or alternatively and preferably, it may be returned into the fluidized bed reactor.

At least one monomer is introduced into the bottom part of the moving bed reactor. Preferably, the monomer is introduced below the level representing 30% of the total height of the moving bed measured from the base of the moving bed. More preferably, the monomer is introduced below the level representing 20%, even more preferably below the level representing 10%, of the total height of the moving bed.

The monomer may be the same as used in the fluidized bed reactor. Monomers which can thus be polymerized include olefins, diolefins and other polyenes. The reactor may thus be used to polymerize ethylene, propylene, 1-butene, 1-pentene, 1-hexene, 4-methyl-1-pentene, 1-heptene, 1-octene, 1-decene, styrene, norbornene, vinyl norbornene, vinylcyclohexane, butadiene, 1,4-hexadiene, 4-methyl-1,7-octadiene, 1,9-decadiene and their mixtures. Especially, the reactor is useful in polymerizing ethylene and propylene and their mixtures, optionally together with other alpha-olefin comonomers having from 4 to 12 carbon atoms.

Especially preferably at least one of the monomers polymerized in the moving bed reactor is the same as is polymerized in the fluidized bed reactor. In particular, at least the main monomer, constituting at least 50% of the total monomer in the moving bed reactor, is the same as the monomer constituting at least 50% of the total monomer in the fluidized bed reactor.

It is preferred that polymers with different properties are produced in the moving bed reactor and the fluidized bed reactor. In one preferred embodiment the polymer produced in the moving bed reactor has a different molecular weight and optionally also a different comonomer content than the polymer produced in the fluidized bed reactor. To achieve this aim a barrier gas is introduced into the moving bed reactor. The objective of the barrier gas is to produce an upwards flowing net stream of gas within the moving bed reactor. This upwards flowing gas stream has a composition which is different from the composition of the fluidization gas stream. The polymerization within the moving bed is then determined by the composition of said upwards flowing gas stream.

The components of the barrier gas include the monomer(s) to be polymerized, eventual chain transfer agent(s) and eventual inert gas or gases. As mentioned above, one or all components of the barrier gas may be introduced into the moving bed reactor as liquid which then vaporizes in the moving bed. The barrier gas is introduced into the bottom part of the moving bed reactor as described above for the monomer.

As mentioned above, the gas flows upwards within the moving bed reactor. The superficial velocity of the upwards flowing gas stream must be lower than the minimum fluidization velocity for the particles forming the moving bed as otherwise the moving bed would be at least partly fluidized. Therefore, the superficial velocity of the gas stream should be from 0.001 to 0.1 m/s, preferably from 0.002 to 0.05 m/s and more preferably from 0.005 to 0.05 m/s.

The barrier gas that has passed the moving bed is withdrawn from the upper part of the moving bed reactor through a gas outlet located there. The majority of the fluidization gas entering the top of the moving bed reactor together with the polymer is withdrawn through the same outlet.

As polymer is withdrawn from the base of the bed the particles move slowly downwards within the bed. The movement is preferably substantially plug-flow where the residence time distribution of the particles in the reactor is narrow. Therefore, each particle has had substantially the same time to polymerize within the moving bed reactor and no particle has passed the reactor without having time to polymerize. This is a difference to a perfectly mixed reactor, such as a fluidized bed reactor, where the residence time distribution is very broad.

According to one preferred embodiment in the moving bed reactor a propylene copolymer is produced which has a higher molecular weight than the propylene copolymer produced in the fluidized bed reactor. Then the barrier gas mixture introduced to the base of the bed contains propylene and comonomer, such as ethylene. In addition, it may contain a small amount of hydrogen. The fluidization gas contains propylene, comonomer and a relatively high amount of hydrogen. The gas mixture above the moving bed is withdrawn from the upper zone of the moving bed reactor. Thereby the hydrogen to propylene mole ratio within the moving bed may be maintained at a lower level than the corresponding ratio in the fluidization gas. In this way the molecular weight of the polymer produced in the moving bed reactor is higher than that of the polymer produced in the fluidized bed reactor.

By adjusting the composition of the barrier gas the polymer produced in the moving bed reactor may alternatively have a lower molecular weight or alternatively or additionally have a higher or lower content of comonomer than the polymer produced in the fluidized bed reactor. It is also, of course, possible to adjust the conditions so that the same polymer is produced in the two reactors.

The temperature within the moving bed reactor may be adjusted according to the needs. It should, however, be lower than the sintering temperature of the polymer contained in the reactor. The temperature can suitably be chosen to be within the range of from 40 to 95° C., preferably from 50 to 90° C. and more preferably from 65 to 90° C., such as 75 or 85° C.

The pressure at the top of the moving bed reactor is preferably close to the pressure at the top of the fluidized bed reactor. Preferably the pressure is from 1 to 50 bar, more preferably from 5 to 35 bar. Especially preferably the pressure differs by no more than 5 bar from the pressure within the fluidized bed reactor. Even more preferably, the pressure is within the range of from 3 bar lower than the pressure within the fluidized bed reactor to the same pressure as is within the fluidized bed reactor.

From a process perspective, the middle zone of the fluidized bed reactor is maintained under conditions such that the superficial gas velocity is from 5 to 80 cm/s, preferably 10 to 70 cm/s.

The polymerization catalyst can be fed directly or can originate from a previous prepolymerization stage, the later being preferred. The polymerization catalyst is preferably introduced into the middle zone via the respective inlet. The withdrawal of the reaction product is preferably continuous such as disclosed in WO-A-00/29452.

In a preferred embodiment according to the present invention the reactor assembly according to the present invention further comprising a loop reactor upstream of said fluidized bed reactor.

In the following the processes according to the present invention are further described. The preferred ranges and dimensions as discussed above with respect to the reactor also apply for the processes and are incorporated by reference herewith.

The present invention relates to a process for the production of polymers in the presence of a polymerization catalyst in a reactor assembly including a fluidized bed reactor as described above. The process comprises feeding a gas mixture comprising at least one monomer into the bottom zone of said fluidized bed reactor;

withdrawing a combined stream of gas and solids from the upper zone of said fluidized bed reactor so as to produce an upwards flowing gas stream within said fluidized bed reactor;

passing said combined stream to means for gas/solids separation;

withdrawing an overhead stream comprising less than 2% by weight of solids from said gas/solids separation and directing said overhead stream comprising less than 2% by weight of solids into the bottom zone;

feeding polymerization catalyst into said fluidized bed reactor;

polymerizing said at least one monomer in the presence of said polymerization catalyst to form a fluidized bed of polymer particles supported by said upwards flowing gas stream;

whereby the fluidized bed occupies at least 70% of the combined volume of the middle zone and the upper zone of said fluidized bed reactor.

The present invention further relates to a process for the production of polymers in the presence of a polymerization catalyst in a reactor assembly including a fluidized bed reactor as described above, the process comprising withdrawing a first polymer stream from said separation step;

directing at least a part of said first polymer stream into a moving bed reactor;

feeding a second gas mixture comprising at least one monomer into said moving bed reactor;

polymerizing said at least one monomer in said moving bed reactor;

withdrawing a second polymer stream from the bottom of said moving bed reactor thereby establishing a downwards moving bed of polymer;

directing at least a part of said second polymer stream into said fluidized bed reactor.

The present invention further relates to a process for the production of polymers in the presence of a polymerization catalyst in a reactor assembly, including a fluidized bed reactor (1) comprising a gas entry section a first domain above and adjacent to the gas entry section, wherein the superficial gas velocity of the fluidization gas is essentially constant, and a second domain being located above and adjacent to the first domain, wherein the superficial gas velocity of the fluidization gas is higher relative to the superficial gas velocity in the first domain, an inlet for the fluidization gas located in a gas entry section, an outlet for the fluidization gas located in the second domain; the outlet for the fluidization gas being coupled with the fluidized bed reactor via a gas circulation line; means for separation of solids from gas being connected to said gas circulation line, the process comprising:

feeding a gas mixture comprising at least one monomer via the gas entry section into the first domain of said fluidized bed reactor;

feeding polymerization catalyst into said fluidized bed reactor;

polymerizing said at least one monomer in the presence of said polymerization catalyst to form a fluidized bed of polymer particles supported by said upwards flowing gas stream;

passing said combined stream to gas/solids separation means;

withdrawing an overhead stream comprising less than 2% by weight of solids from said separation step and directing said overhead stream comprising less than 2% by weight of solids into said gas entry section.

The processes according to the present invention preferably concern the polymerization of polyolefins. More preferably the polyolefins are momoners selected from the group of ethylene, propylene, and $C_4$ to $C_{12}$ alpha olefins.

Figure 1:
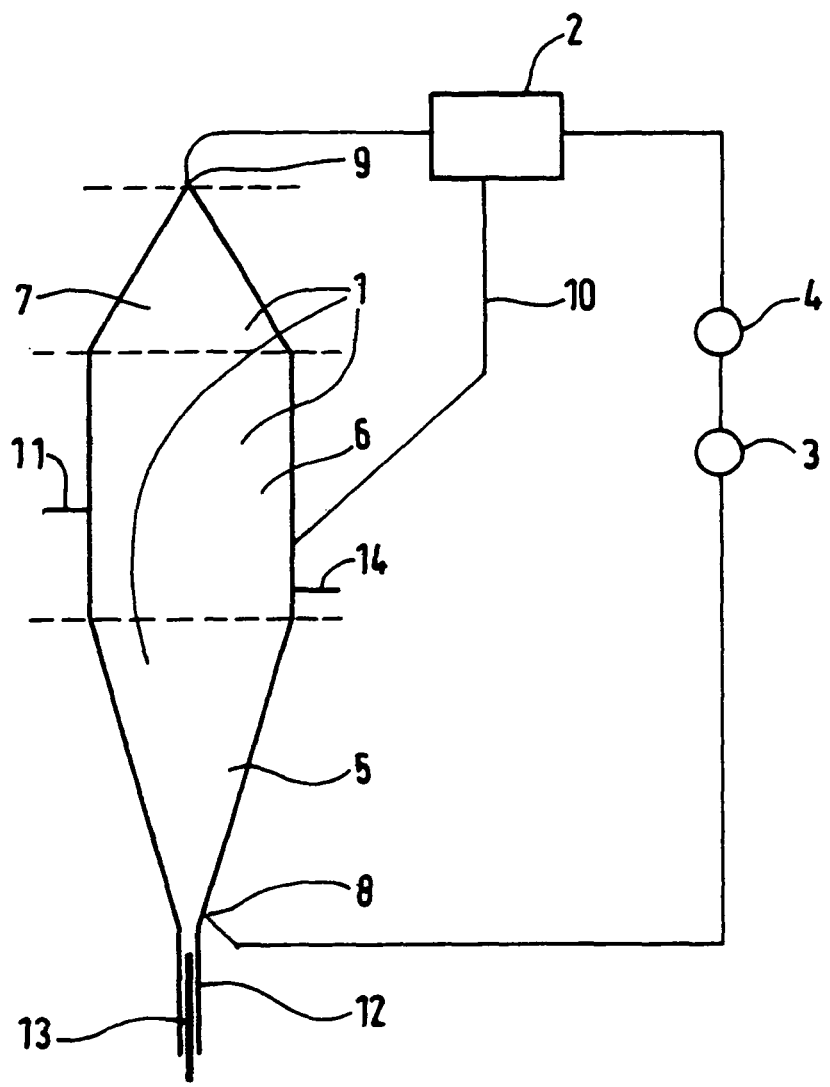
FIG. 1 is sectional drawing of the reactor assembly including a fluidized bed reactor.
Figure 2:
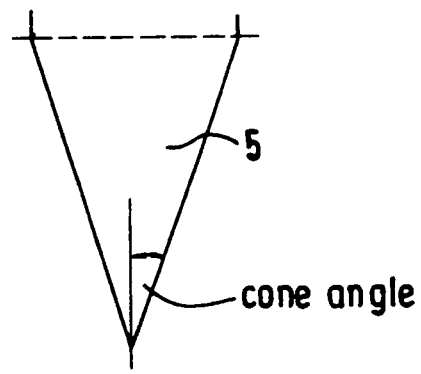
FIG. 2 is a sectional drawing of the cone shaped bottom zone. The cone-angle being the angle between the axis of the cone and the lateral surface is shown.

REFERENCE LIST 1 fluidized bed reactor
2 cyclone
3 means for cooling
4 means for pressurizing
5 bottom zone
6 middle zone
7 upper zone
8 inlet for fluidization gas
9 outlet
10 line for the recycling of solids
11 inlet for catalyst or prepolymer 12 outlet for sheets, chunks, and lumps
13 means for break-up of sheets
14 outlet for the polymer
15 moving bed reactor
16 lower section of the moving bed reactor)
17 upper section of moving bed reactor
18 inlet for the injection of a barrier gas (moving bed reactor)
19 inlet for solids (moving bed reactor)
20 outlet for gas (moving bed reactor)
21 outlet for solids to be recycled
22 feeding means for recycling solids
23 inlet for feeding/recycling solids
24 means for cooling (moving bed)
25 means for pressurizing (moving bed)

DETAILED DESCRIPTION WITH RESPECT TO THE DRAWINGS

The invention shall now be explained with respect to the drawings.

According to FIG. 1, the reactor assembly according to the invention includes a fluidized bed reactor (1) having a cone shaped bottom zone (5), a cylindrical shaped middle zone (6) and a cone shaped upper zone (7).

The reactor assembly is further equipped with means for gas/solids separation (2) and means for cooling (3) as well as means for pressurizing (4).

The fluidized bed reactor has an inlet (8) for the fluidization gas located in the bottom zone (5).

The fluidized bed reactor further comprises an outlet for the fluidization gas (9) located in the upper zone (7). Via the outlet (9) the fluidization gas is passed through the cyclone (2), the cooling means (3) and the pressurizing means (4) into the gas inlet (8) of the fluidized bed reactor.

The bottom zone (5) and the middle zone (6) (and also the upper zone (7)) form an unobstructed passageway as there is no distribution plate.

The cross-sectional diameter of the bottom zone (5) is strictly monotonically increasing with respect to the flow direction of the fluidization gas through the fluidized bed reactor. In FIG. 1, the cross-sectional diameter increase is constant in vertical direction as the bottom zone is only curved in two dimensions but not in three-dimensions.

The middle zone (6) has constant cross-sectional diameter with respect to the flow direction of the fluidization gas through the fluidized bed reactor.

Further installations such as monitoring equipment are not shown in FIG. 1.

The cross-sectional diameter of the upper zone (7) is monotonically decreasing in the direction of flow of the fluidization gas through the fluidized bed reactor.

Figure 3:
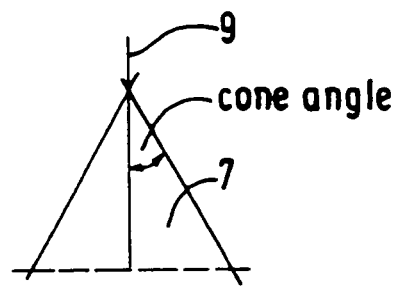
FIG. 3 is a sectional drawing of the cone shaped upper zone.

FIG. 3 is a sectional drawing of the cone shaped upper zone.

Figure 4:
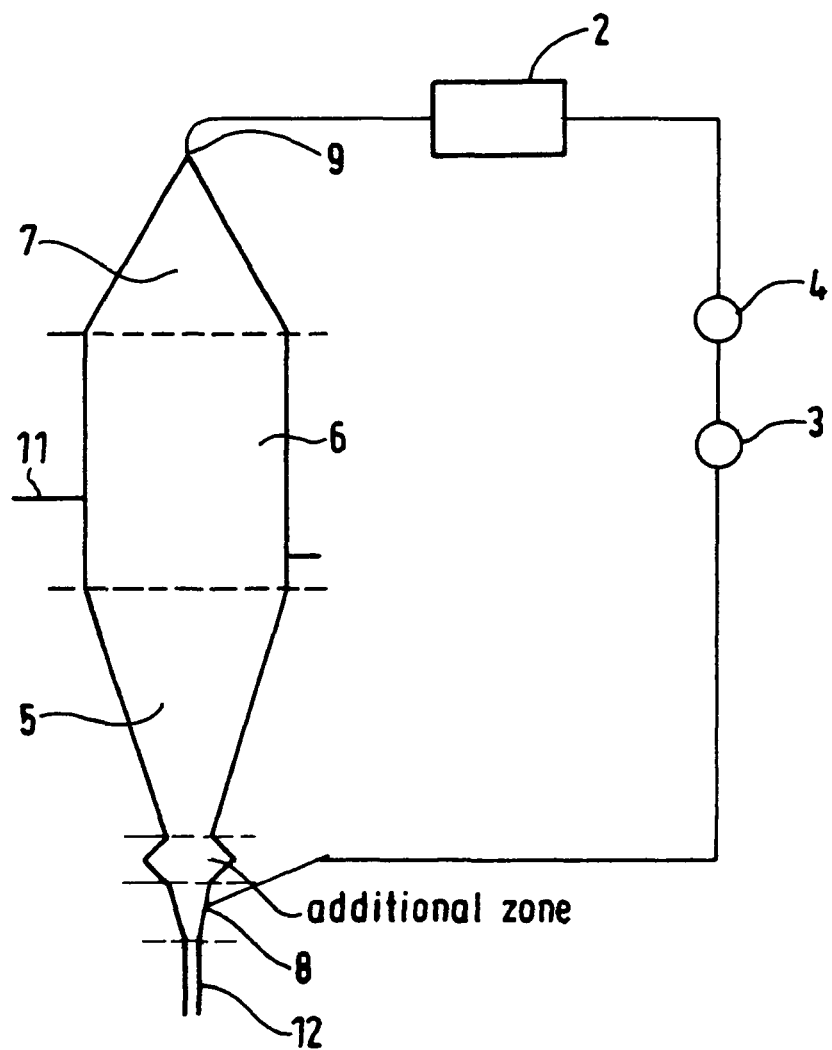
FIG. 4 shows an embodiment of a fluidized bed reactor consisting of four zones, bottom zone (5), middle zone (6) and upper zone (7), and an additional zone being located below the bottom zone.

FIG. 4 shows an embodiment of a fluidized bed reactor consisting of four zones, bottom zone (5), middle zone (6) and upper zone (7), and an additional zone being located below the bottom zone.

Figure 5:
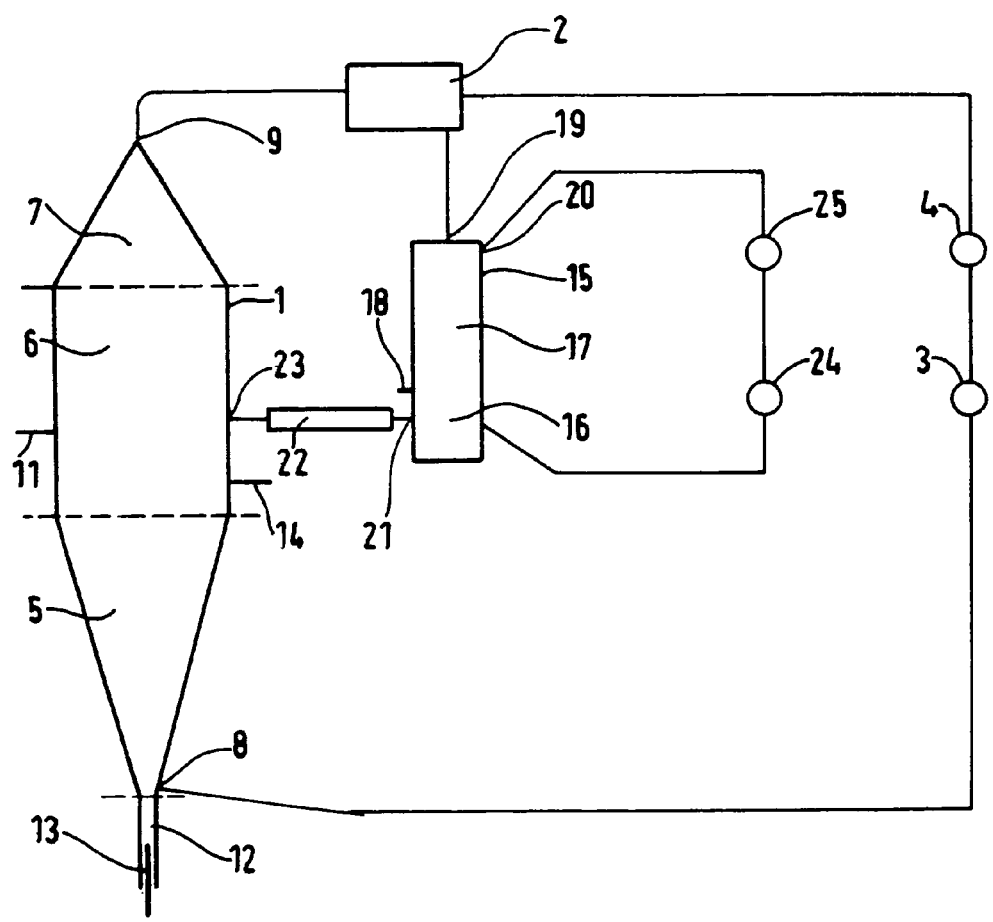
FIG. 5 is a sectional drawing of the dual reactor assembly according to the invention.

The perspective view of the FIG. 5 depicts the dual reactor assembly according to the invention as a sectional drawing.

EXAMPLES

General Conditions Used for the Examples

In examples 1 to 5 the reactor was operated at an absolute pressure of 1 bar and a temperature of 25° C. Air was used as the fluidization gas. The bed was formed of polyethylene particles having an average diameter of about 250 μm. The polyethylene had a density of 923 kg/m³ and an MFR$_5$ of 0.24 g/10 min.

The invention was exemplified with a reactor assembly having the following properties
Height of the bottom zone: 1330 mm
Height of the middle zone: 2050 mm
Height of the upper zone: 415 mm
Diameter of the middle zone: 480 mm The reactor was made of plexiglas so that the fluidization behavior and bubble sizes within the bed could be observed visually.

TABLE 1

(Examples 1 to 5)

|  | 1 | 2 | 3 | 4 | 5 |
|---|---|---|---|---|---|
| flow rate of fluidization gas [m³/h] | 65 |  | 195 | 130 |  |
| bed height* [mm] | 1100 | 2100 |  |  | 1500 |
| filling degree of bed** [%] | 49 | 94 |  |  |  |
|  | stable | stable | stable lump removal | stable lump removal | stable |

*starting from plane separating lower and middle zone
**with respect to the volume of the middle and upper zone

Example 1

The reactor as described above was operated so that flow rate of the fluidization gas was 65 m³/h and the bed height was 1100 mm (corresponding to about 49% of the combined volume of the middle and upper zones) from the bottom of the cylindrical section. The gas flow rate corresponds to a superficial gas velocity of 10 cm/s.

It could be seen that the bubble size increased when the bubbles reached the upper part of the bed.

Example 2

The procedure of Example 1 was repeated with the exception that the bed height was 2100 mm (corresponding to 94% of the combined volume of the middle and upper zones). Also in this case the reactor could be operated in a stable manner for hours. The polymer carried over by the fluidization gas could be easily separated from the gas in a separation vessel where the polymer was allowed to settle and a clean fluidization gas stream containing less 3 (5) than 1% by weight of particles was obtained. The polymer recovered in the separation vessel was a representative sample of the total polymer. Thus, no segregation of polymer fines could be observed.

It could be seen that even though small bubbles were present in the fluidized bed, big bubbles having a diameter of more than half of the bed diameter, were absent.

Example 3

The procedure of Example 1 was repeated except that the gas flow was 195 m³/h corresponding to a superficial gas velocity of 30 cm/s. The operation of the reactor was stable and without problems. During the operation lumps having a weight of about 12 grams were introduced into the upper part of the fluidized bed. In average within a period of about 400 seconds the lumps travelled through the bed to the bottom of the reactor and they could be removed via the vertical pipe at the bottom.

Example 4

The procedure of Example 1 was repeated except that the gas flow was 130 m³/h corresponding to a superficial gas velocity of 20 cm/s. During the operation lumps having a weight of about 12 grams were introduced into the upper part of the fluidized bed. In average within a period of about 700 seconds the lumps travelled through the bed to the bottom of the reactor and they could be removed via the vertical pipe at the bottom.

Example 5

The procedure of Example 4 was repeated except that the bed height was 1500 mm. The polymer carried over by the fluidization gas could be easily separated from the gas in a separation vessel where the polymer was allowed to settle and a clean fluidization gas stream containing less than 1% by weight of particles was obtained. During the operation lumps having a weight of about 12 grams were introduced into the upper part of the fluidized bed. In average within a period of about 2700 seconds the lumps travelled through the bed to the bottom of the reactor and they could be removed via the vertical pipe at the bottom.

Example 6

The invention was further exemplified with a reactor made of steel having the following dimensions:
Height of the bottom zone: 1680 mm
Diameter at the bottom of the bottom zone: 175 mm
Height of the middle zone: 2050 mm
Height of the upper zone: 670 mm
Diameter of the middle zone: 770 mm The operation of the reactor was stable and without problems.

The reactor described above was used for copolymerization of ethylene and 1-butene at a temperature of 80° C. and a pressure of 20 bar. The height of the fluidized bed, calculated from the bottom of the middle zone was 2100 mm.

Ethylene homopolymer ($MFR_2$=300 g/10 min, density 974 kg/m³) produced in a loop reactor and still containing the active catalyst dispersed therein was introduced into the reactor via an inlet located in the bottom zone at a rate of 40 kg/h. Ethylene, hydrogen and 1-butene were continuously introduced into the circulation gas line so that the ethylene concentration in the fluidization gas was 17% by mole, the ratio of 1-butene to ethylene was 100 mol/kmol and the ratio of hydrogen to ethylene was 15 mol/kmol. The reminder of the fluidization gas was nitrogen. The flow rate of the gas was adjusted so that the superficial gas velocity in the cylindrical part of the reactor was 15 cm/s. The resulting copolymer could be easily withdrawn via an outlet at a rate of 80 kg/h.

The fluidization gas withdrawn from the top of the reactor was passed through a cyclone. The polymer separated from the gas was mixed with the above-mentioned homopolymer stream and thus returned to the fluidized bed reactor.

Comparative Example 7

For comparison, a conventional fluidized bed reactor (hemispherical bottom, cylindrical body, conical part connecting another cylindrical zone forming a disengagement zone) equipped with a fluidization grid was used.
Height of the gas entry zone (below the fluidization grid): 1080 mm
Diameter of the cylindrical part: 800 mm
Height of the cylindrical part (above the fluidization grid) 1870 mm
Height of the conical part*: 2270 mm
Height of the disengagement zone: 1730 mm
Diameter of the disengagement zone: 1600 mm
*connecting the cylindrical part to the disengagement zone.

Throughput was the same as in Example 6. However, the combined volume of the reaction zone (0.94 m³), disengagement zone (4.12 m³) and the conical section joining the two abovementioned zones (2.66 m³) was about 7.7 m³ which greatly exceeds the total volume of the design of Example 6 which was 1.7 m³.

Example 8

The reactor assembly comprising a moving bed reactor was used in the polymerization of propylene as follows:

Polymer slurry containing unreacted propylene and homopolymer of propylene having a melt index $MFR_{10}$ of 0.42 g/10 min was introduced into the reactor operated at 85° C. and 30 bar so that the feed rate of polypropylene was 36 kg/h and the concentration of the polymer in the slurry was about 50% by weight. Additional propylene and hydrogen, as well as nitrogen as an inert gas, were fed into the reactor so that the content of propylene was 73% by mole and the ratio of hydrogen to propylene was 186 mol/kmol. The production rate in the fluidized bed reactor was 44 kg/h. The superficial velocity of the fluidization gas in the fluidized bed reactor was 25 cm/s. The height of the bed, calculated from the bottom of the cylindrical middle zone was 2100 mm.

The reaction mixture from the fluidized bed reactor was withdrawn via an outlet at the top cone and was introduced into a second gas phase moving bed reactor operated at a temperature of 85° C. and a pressure of 20 bar. Additional propylene was introduced into the moving bed reactor at the middle of the lower cylindrical section. The ratio of hydrogen to propylene at the bottom of the moving bed reactor was 0.75 mol/kmol. The production rate in the reactor was 8 kg/h. The polymer was then reintroduced into the bottom cone of the fluidized bed reactor by using a screw feeder.

Polypropylene was withdrawn from the fluidized bed reactor via the outlet located at the bottom part of the cylindrical section at a rate of 88 kg/h.

Comparative Example 9

The procedure of Example 6 was repeated except that the bed height was adjusted to 1100 mm, calculated from the bottom of the middle zone. The production rate of the copolymer in the fluidized bed reactor was now 21 kg/h so that in total 61 kg/h of copolymer was withdrawn from the fluidized bed reactor. The reduction in the total polymer production rate compared to Example 6 was thus 19 kg/h.

In the following clauses, Preferred Embodiments of the Invention are Described:

1. Reactor assembly for the production of polymers including a fluidized bed reactor (1) comprising a bottom zone (5), a middle zone (6) and an upper zone (7), an inlet (8) for the fluidization gas located in the bottom zone (5), an outlet (9) for the fluidization gas located in the upper zone (7);

the outlet (9) for the fluidization gas being coupled with the fluidized bed reactor (1) via inlet (8) via a gas circulation line;

means for separation of solids from gas (2) being connected to said gas circulation line;

the equivalent cross-sectional diameter of the upper zone (7) being monotonically decreasing with respect to the flow direction of the fluidization gas through the fluidized bed reactor;

the middle zone (6) having an essentially constant equivalent cross-sectional diameter with respect to the flow direction of the fluidization gas through the fluidized bed reactor;

characterized in that the ratio of the height of the fluidized bed reactor to the equivalent cross-sectional diameter of the middle zone of the fluidized bed reactor is from 2 to 10; and whereby said upper zone (7) is directly connected to said middle zone (6).

2. Reactor assembly for the production of polymers according to clause 1 wherein the upper zone (7) is cone-shaped and the middle zone (6) is cylindrical shaped.

3. Reactor assembly for the production of polymers according to clause 2, whereby the cone angle of the cone-shaped upper zone (7) is 10° to 50°.

4. The reactor assembly according to any one of the preceding clauses wherein the bottom zone (5) of the fluidized bed reactor (1) is monotonically increasing with respect to the flow direction of the fluidization gas through the fluidized bed reactor and that there is an unobstructed passageway in the direction of flow of the fluidization gas through the fluidized bed reactor from the bottom zone (5) to the upper zone (7).

5. Reactor assembly for the production of polymers according to any one of the preceding clauses, further comprising an inlet (11) for the catalyst or catalyst containing prepolymer.

6. Reactor assembly for the production of polymers according to clause 4 or 5 further comprising an outlet (12) for the removal of sheets, chunks and lumps.

7. Reactor assembly for the production of polymers according clause 6, whereby outlet (12) for the removal of sheets, chunks and lumps is located in the bottom zone (5).

8. Reactor assembly for the production of polymers according to clause 7 further comprising means (13) for the break-up of sheets, chunks and/or lumps.

9. Reactor assembly for the production of polymers according to any of the preceding clauses wherein the ratio of the height of the upper zone to the equivalent cross-sectional diameter of the middle zone is within the range of from 0.3 to 1.5.

10. Reactor assembly for the production of polymers according to clause 4 to 8, wherein the cone angle of the cone-shaped bottom zone (5) is 5° to 25°.

11. Reactor assembly for the production of polymers according to any of the preceding clauses, further comprising an outlet (14) for the polymer.

12. The reactor assembly according to any of the preceding clauses further comprising a moving bed reactor (15) having a lower section (16) and an upper section (17), an inlet (18) for the barrier gas, an inlet (19) for solids, and an outlet (20) for gas being located in the upper section (17), an outlet (21) for withdrawing solids from the moving bed reactor; the outlet (21) of the moving bed reactor being coupled with inlet (23) of the fluidized bed reactor (1) with optional feeding means for solids (22) located between;

the means for gas/solids separation (2) being coupled with the moving bed reactor (15) via inlet (19).

13. The reactor assembly according clause 12 further comprising at least one outlet (14) for the polymer in the fluidized bed reactor and/or the moving bed reactor.

14. The reactor assembly according to any of the preceeding clauses further comprising a loop reactor upstream of said fluidized bed reactor.

15. A process for the production of polymers in the presence of a polymerization catalyst in a reactor assembly including a fluidized bed reactor according to any of clauses 1 to 14, the process comprising:

feeding a gas mixture comprising at least one monomer into the bottom zone of said fluidized bed reactor;

withdrawing a combined stream of gas and solids from the upper zone of said fluidized bed reactor so as to produce an upwards flowing gas stream within said fluidized bed reactor;

passing said combined stream to means for gas/solids separation;

withdrawing an overhead stream comprising less than 2% by weight of solids from said gas/solids separation and directing said overhead stream comprising less than 2% by weight of solids into the bottom zone;

feeding polymerization catalyst into said fluidized bed reactor;

polymerizing said at least one monomer in the presence of said polymerization catalyst to form a fluidized bed of polymer particles supported by said upwards flowing gas stream;

characterized in that said fluidized bed occupies at least 70% of the combined volume of the middle zone and the upper zone of said fluidized bed reactor.

16. Process according to clause 15 for the production of polymers in the presence of a polymerization catalyst in a reactor assembly including a fluidized bed reactor according to clause 12, the process comprising withdrawing a first polymer stream from said separation step;

directing at least a part of said first polymer stream into a moving bed reactor;

feeding a second gas mixture comprising at least one monomer into said moving bed reactor;

polymerizing said at least one monomer in said moving bed reactor;

withdrawing a second polymer stream from the bottom of said moving bed reactor thereby establishing a downwards moving bed of polymer;

directing at least a part of said second polymer stream into said fluidized bed reactor.

17. A process for the production of polymers in the presence of a polymerization catalyst in a reactor assembly, including a fluidized bed reactor (1) comprising a gas entry section a first domain above and adjacent to the gas entry section, wherein the superficial gas velocity of the fluidization gas is essentially constant, and a second domain being located above and adjacent to the first domain, wherein the superficial gas velocity of the fluidization gas is higher relative to the superficial gas velocity in the first domain, an inlet for the fluidization gas located in a gas entry section, an outlet for the fluidization gas located in the second domain; the outlet for the fluidization gas being coupled with the fluidized bed reactor via a gas circulation line; means for separation of solids from gas being connected to said gas circulation line, the process comprising:

feeding a gas mixture comprising at least one monomer via the gas entry section into the first domain of said fluidized bed reactor;

feeding polymerization catalyst into said fluidized bed reactor;

polymerizing said at least one monomer in the presence of said polymerization catalyst to form a fluidized bed of polymer particles supported by said upwards flowing gas stream;

passing said combined stream to gas/solids separation means;

withdrawing an overhead stream comprising less than 2% by weight of solids from said separation step and directing said overhead stream comprising less than 2% by weight of solids into said gas entry section.

The invention claimed is:

1. Reactor assembly for the production of polymers including a fluidized bed reactor (1) comprising a bottom zone (5), a middle zone (6) and an upper zone (7), an inlet (8) for the fluidization gas located in the bottom zone (5), an outlet (9) for the fluidization gas located in the upper zone (7);

the outlet (9) for the fluidization gas being coupled with the fluidized bed reactor (1) via inlet (8) via a gas circulation line;

means for separation of solids from gas (2) being connected to said gas circulation line;

the equivalent cross-sectional diameter of the upper zone (7) being monotonically decreasing with respect to the flow direction of the fluidization gas through the fluidized bed reactor;

the middle zone (6) having an essentially constant equivalent cross-sectional diameter with respect to the flow direction of the fluidization gas through the fluidized bed reactor;

the equivalent cross-sectional diameter of the bottom zone being monotonically increasing with respect to the flow direction of the fluidization gas through the fluidized bed reactor;

whereby monotonically increasing equivalent cross-sectional diameter means that the average diameter increases or is constant with respect to the flow direction of the fluidization gas through the fluidized bed reactor; and whereby monotonically decreasing equivalent cross-sectional diameter means that the equivalent cross-sectional diameter will decrease or is constant with respect to the flow direction of the fluidization gas through the fluidized bed reactor;

characterized in that the ratio of the height of the fluidized bed reactor to the equivalent cross-sectional diameter of the middle zone of the fluidized bed reactor is from 2 to 10;

whereby said upper zone (7) is directly connected to said middle zone (6);

whereby the boundary plane delimiting bottom zone and middle zone is the plane, where the equivalent cross-sectional diameter changes from increasing values to essentially constant values;

whereby the boundary plane delimiting middle zone and upper zone is the plane, where the equivalent cross-sectional diameter changes from essentially constant values to decreasing values;

whereby there is an unobstructed passageway in the direction of flow of the fluidization gas through the fluidized bed reactor from the bottom zone (5) to the upper zone (7); and whereby the ratio of the height of the upper zone to the equivalent cross-sectional diameter of the middle zone is within the range of from 0.7 to 1.1.

2. Reactor assembly for the production of polymers according to claim 1 wherein the upper zone (7) is cone-shaped and the middle zone (6) is cylindrical shaped.

3. Reactor assembly for the production of polymers according to claim 1, wherein the upper zone (7) is cone-shaped and the middle zone (6) is cylindrical shaped, whereby the cone angle of the cone-shaped upper zone (7) is 10° to 50°.

4. Reactor assembly for the production of polymers according to claim 1, further comprising an inlet (11) for the catalyst or catalyst containing prepolymer.

5. Reactor assembly for the production of polymers according to claim 1 further comprising an outlet (12) for the removal of sheets, chunks and lumps.

6. Reactor assembly for the production of polymers according to claim 1, further comprising an outlet (12) for the removal of sheets, chunks and lumps, whereby outlet (12) for the removal of sheets, chunks and lumps is located in the bottom zone (5).

7. Reactor assembly for the production of polymers according to claim 1, further comprising an outlet (12) for the removal of sheets, chunks and lumps being located in the bottom zone (5); and further comprising means (13) for the break-up of sheets, chunks and/or lumps.

8. Reactor assembly for the production of polymers according to claim 1, wherein bottom zone (5) is cone-shaped and has a cone angle of 5° to 25°.

9. Reactor assembly for the production of polymers according to claim 1, further comprising an outlet (14) for the polymer.

10. The reactor assembly according to claim 1 further comprising a moving bed reactor (15) having a lower section (16) and an upper section (17), an inlet (18) for a barrier gas, an inlet (19) for solids, and an outlet (20) for gas being located in the upper section (17), an outlet (21) for withdrawing solids from the moving bed reactor; the outlet (21) of the moving bed reactor being coupled with inlet (23) of the fluidized bed reactor (1) with optional feeding means for solids (22) located between;

the means for gas/solids separation (2) being coupled with the moving bed reactor (15) via inlet (19).

11. A process for the production of polymers in the presence of a polymerization catalyst in a reactor assembly including a fluidized bed reactor (1) comprising a bottom zone (5), a middle zone (6) and an upper zone (7), an inlet (8) for the fluidization gas located in the bottom zone (5), an outlet (9) for the fluidization gas located in the upper zone (7);

the outlet (9) for the fluidization gas being coupled with the fluidized bed reactor (1) via inlet (8) via a gas circulation line;

means for separation of solids from gas (2) being connected to said gas circulation line;

the equivalent cross-sectional diameter of the upper zone (7) being monotonically decreasing with respect to the flow direction of the fluidization gas through the fluidized bed reactor, whereby monotonically decreasing equivalent cross-sectional diameter means that the equivalent cross-sectional diameter will decrease or is constant with respect to the flow direction of the fluidization gas through the fluidized bed reactor;

the middle zone (6) having an essentially constant equivalent cross-sectional diameter with respect to the flow direction of the fluidization gas through the fluidized bed reactor;

the equivalent cross-sectional diameter of the bottom zone being monotonically increasing with respect to the flow direction of the fluidization gas through the fluidized bed reactor, whereby monotonically increasing equivalent cross-sectional diameter means that the average diameter increases or is constant with respect to the flow direction of the fluidization gas through the fluidized bed reactor;

characterized in that the ratio of the height of the fluidized bed reactor to the equivalent cross-sectional diameter of the middle zone of the fluidized bed reactor is from 2 to 10;

wherein said upper zone (7) is directly connected to said middle zone (6);

wherein the boundary plane delimiting bottom zone and middle zone is the plane, where the equivalent cross-sectional diameter changes from increasing values to essentially constant values;

wherein the boundary plane delimiting middle zone and upper zone is the plane, where the equivalent cross-sectional diameter changes from essentially constant values to decreasing values;

wherein there is an unobstructed passageway in the direction of flow of the fluidization gas through the fluidized bed reactor from the bottom zone (5) to the upper zone (7), the process comprising:

feeding a gas mixture comprising at least one monomer into the bottom zone of said fluidized bed reactor;

withdrawing a combined stream of gas and solids from the upper zone of said fluidized bed reactor so as to produce an upwards flowing gas stream within said fluidized bed reactor;

passing said combined stream to means for gas/solids separation;

withdrawing an overhead stream comprising less than 2% by weight of solids from said gas/solids separation and directing said overhead stream comprising less than 2% by weight of solids into the bottom zone;

feeding polymerization catalyst into said fluidized bed reactor;

polymerizing said at least one monomer in the presence of said polymerization catalyst to form a fluidized bed of polymer particles supported by said upwards flowing gas stream;

characterized in that said fluidized bed occupies at least 70% of the combined volume of the middle zone and the upper zone of said fluidized bed reactor; and a part of said upwards flowing gas stream forms an emulsion phase with the polymer particles and the remaining part passes the bed in the form of bubbles.

12. Process according to claim 11 comprising withdrawing a first polymer stream from said separation step;

directing at least a part of said first polymer stream into a moving bed reactor;

feeding a second gas mixture comprising at least one monomer into said moving bed reactor;

polymerizing said at least one monomer in said moving bed reactor;

withdrawing a second polymer stream from the bottom of said moving bed reactor thereby establishing a downwards moving bed of polymer; directing at least a part of said second polymer stream into said fluidized bed reactor.

13. The process according to claim 11 wherein the superficial velocity of the gas in the middle zone is higher than the minimum fluidization velocity and lower than the terminal velocity.

14. The process according to claim 12 wherein the superficial velocity of the gas in the middle zone is higher than the minimum fluidization velocity and lower than the terminal velocity.

* * * * *